(12) United States Patent
Boutin et al.

(10) Patent No.: US 12,240,302 B2
(45) Date of Patent: Mar. 4, 2025

(54) TARPAULIN PROTECTION DEVICES

(71) Applicant: FABRICATION ELCARGO INC., Saint-Hyacinthe (CA)

(72) Inventors: Keven Boutin, Drummondville (CA); Etienne Brunet, Drummondville (CA); Kendrick Martin, La Prairie (CA)

(73) Assignee: FABRICATION ELCARGO INC., Saint-Hyacinthe (CA)

( * ) Notice: Subject to any disclaimer, the term of this patent is extended or adjusted under 35 U.S.C. 154(b) by 254 days.

(21) Appl. No.: 17/770,597

(22) PCT Filed: Dec. 17, 2020

(86) PCT No.: PCT/IB2020/062073
§ 371 (c)(1),
(2) Date: Apr. 20, 2022

(87) PCT Pub. No.: WO2021/124174
PCT Pub. Date: Jun. 24, 2021

(65) Prior Publication Data
US 2022/0289008 A1 Sep. 15, 2022

Related U.S. Application Data

(60) Provisional application No. 62/950,631, filed on Dec. 19, 2019.

(51) Int. Cl.
*B60J 7/10* (2006.01)
*B60J 7/06* (2006.01)
*B60J 7/08* (2006.01)

(52) U.S. Cl.
CPC .............. *B60J 7/102* (2013.01); *B60J 7/062* (2013.01); *B60J 7/068* (2013.01); *B60J 7/085* (2013.01)

(58) Field of Classification Search
CPC ... B60J 7/062; B60J 7/068; B60J 7/085; B60J 7/102
(Continued)

(56) References Cited

U.S. PATENT DOCUMENTS

| 473,292 A | 4/1892 | Campbell et al. |
| 1,318,820 A | 10/1919 | Watkins |

(Continued)

FOREIGN PATENT DOCUMENTS

EP  2535217  5/2015

OTHER PUBLICATIONS

PCT Search report for PCT patent application PCT/IB2020/062073, from which the present patent application is a national phase, issued on Mar. 23, 2021.

(Continued)

*Primary Examiner* — Jason S Morrow

(57) ABSTRACT

A flutter reducer for protecting at least partially a tarpaulin defining a tarpaulin rear end edge from flutter induced damages when the tarpaulin is secured laterally across a container moved at speed, the container defining a container aperture delimited by an aperture peripheral edge. The flutter reducer is operatively coupled to the tarpaulin so that when the tarpaulin is extended across the container aperture configuration and the container is moved by the vehicle, the flutter reducer limits movements of the tarpaulin at its tarpaulin rear end edge to reduce flutter due to relative wind caused by movement through air of the container.

17 Claims, 3 Drawing Sheets

(58) Field of Classification Search
USPC .............................. 296/98, 100.14, 100.12
See application file for complete search history.

(56) References Cited

U.S. PATENT DOCUMENTS

| | | | |
|---|---|---|---|
| 1,784,248 | A | 12/1930 | Nolen et al. |
| 1,786,048 | A | 12/1930 | Williams |
| 2,562,300 | A | 7/1951 | Dingman |
| 2,976,082 | A | 3/1961 | Dahlman |
| 2,997,967 | A | 8/1961 | Malapert |
| 3,366,414 | A | 1/1968 | Gile et al. |
| 3,384,413 | A | 5/1968 | Sargent |
| 3,423,126 | A | 1/1969 | Galvin et al. |
| 3,453,020 | A | 7/1969 | Santillo, Jr. |
| 3,768,540 | A * | 10/1973 | McSwain .................. E06B 9/24 296/105 |
| 3,785,694 | A | 1/1974 | Sargent |
| 3,819,082 | A | 6/1974 | Rosenvold |
| 3,829,154 | A | 8/1974 | Becknell |
| 3,889,321 | A | 6/1975 | Moser |
| 4,027,360 | A | 6/1977 | Moser |
| 4,212,492 | A | 7/1980 | Johnsen |
| 4,225,175 | A | 9/1980 | Fredin |
| 4,234,224 | A | 11/1980 | Rosenvold |
| 4,279,064 | A | 7/1981 | Simme |
| 4,302,043 | A | 11/1981 | Dimmer et al. |
| 4,369,009 | A | 1/1983 | Fulford |
| 4,380,350 | A | 4/1983 | Block |
| RE31,746 | E | 11/1984 | Dimmer et al. |
| 4,480,652 | A * | 11/1984 | Gooch .................. B63B 17/02 160/238 |
| 4,484,732 | A | 11/1984 | Gould |
| 4,484,777 | A | 11/1984 | Michel |
| 4,505,512 | A | 3/1985 | Schmeichel et al. |
| 4,518,193 | A | 5/1985 | Heider et al. |
| 4,529,098 | A | 7/1985 | Heider et al. |
| 4,657,062 | A | 4/1987 | Tuerk |
| 4,659,134 | A | 4/1987 | Johnson |
| 4,673,208 | A | 6/1987 | Tsukamoto |
| 4,691,957 | A | 9/1987 | Ellingson |
| 4,700,985 | A | 10/1987 | Whitehead |
| 4,834,445 | A | 5/1989 | Odegaard |
| 4,858,984 | A | 8/1989 | Weaver |
| 4,909,563 | A | 3/1990 | Walker |
| 4,915,439 | A | 4/1990 | Cramaro |
| 1,987,942 | A | 1/1991 | Eriksson |
| 4,991,901 | A | 2/1991 | Meekhof, Sr. et al. |
| 5,002,328 | A | 3/1991 | Michel |
| 5,026,109 | A | 6/1991 | Merlot, Jr. |
| 5,050,923 | A | 9/1991 | Petelka |
| 5,086,908 | A | 2/1992 | Gladish et al. |
| 5,174,625 | A | 12/1992 | Gothier et al. |
| 5,179,991 | A | 1/1993 | Haddad, Jr. |
| 5,180,203 | A | 1/1993 | Goudy |
| 5,186,231 | A | 2/1993 | Lewis |
| 5,211,440 | A | 5/1993 | Cramaro |
| 5,240,303 | A | 8/1993 | Hageman |
| 5,253,914 | A | 10/1993 | Biancale |
| 5,328,228 | A | 7/1994 | Klassen |
| 5,429,403 | A | 7/1995 | Brasher |
| 5,466,030 | A | 11/1995 | Harris et al. |
| 5,540,475 | A | 7/1996 | Kersting et al. |
| 5,542,734 | A | 8/1996 | Burchett et al. |
| 5,549,347 | A | 8/1996 | Anderson |
| 5,658,037 | A | 8/1997 | Evans et al. |
| 5,690,377 | A | 11/1997 | Denyer |
| 5,692,793 | A | 12/1997 | Wilson |
| 5,697,663 | A | 12/1997 | Chenowth |
| 5,713,712 | A | 2/1998 | McIntyre |
| 5,762,002 | A | 6/1998 | Dahlin et al. |
| 5,765,901 | A | 6/1998 | Wilkens |
| 5,794,528 | A | 8/1998 | Gronig et al. |
| 5,823,067 | A | 10/1998 | Clarys et al. |
| 5,911,467 | A | 6/1999 | Evans et al. |
| 5,924,758 | A | 7/1999 | Dimmer et al. |
| 5,938,270 | A | 8/1999 | Swanson et al. |
| 5,984,379 | A | 11/1999 | Michel et al. |
| 6,007,138 | A | 12/1999 | Cramaro |
| 6,135,534 | A | 10/2000 | Schmeichel |
| 6,142,553 | A | 11/2000 | Bodecker |
| 6,142,554 | A | 11/2000 | Carroll et al. |
| 6,152,516 | A | 11/2000 | Williams |
| 6,193,299 | B1 | 2/2001 | Than |
| 6,199,935 | B1 | 3/2001 | Waltz et al. |
| 6,206,449 | B1 | 3/2001 | Searfoss |
| 6,234,562 | B1 | 5/2001 | Henning |
| 6,318,790 | B1 | 11/2001 | Henning |
| 6,322,041 | B1 | 11/2001 | Schmeichel |
| 6,361,100 | B1 | 3/2002 | Koester |
| 6,435,595 | B1 | 8/2002 | Chenowth |
| 6,435,599 | B2 | 8/2002 | Than |
| 6,478,361 | B1 | 11/2002 | Wood |
| 6,513,856 | B1 | 2/2003 | Swanson et al. |
| 6,527,331 | B2 | 3/2003 | Searfoss |
| 6,595,594 | B2 | 7/2003 | Royer |
| 6,655,726 | B2 | 12/2003 | Bergeron |
| 6,715,817 | B2 | 4/2004 | Nolan et al. |
| 6,779,828 | B1 | 8/2004 | Poyntz |
| 6,783,168 | B2 | 8/2004 | Searfoss |
| 6,805,395 | B2 | 10/2004 | Royer |
| 6,886,879 | B2 | 5/2005 | Nolan et al. |
| 6,905,161 | B2 | 6/2005 | Fliege et al. |
| 6,926,337 | B2 | 9/2005 | Poyntz |
| 7,189,042 | B1 | 3/2007 | Schmit |
| 7,506,912 | B2 | 3/2009 | Royer |
| 7,513,561 | B2 | 4/2009 | Royer |
| 7,549,695 | B2 | 6/2009 | Royer |
| 8,177,284 | B1 | 5/2012 | Royer |
| 8,641,123 | B1 | 2/2014 | Royer |
| 8,998,287 | B2 | 4/2015 | Smith et al. |
| 2002/0021018 | A1 | 2/2002 | Royer |
| 2002/0043816 | A1 | 4/2002 | Johnston |
| 2002/0109371 | A1 | 8/2002 | Wheatley |
| 2002/0135199 | A1 | 9/2002 | Hanning |
| 2003/0052506 | A1 | 3/2003 | Royer |
| 2003/0090124 | A1 | 5/2003 | Nolan |
| 2003/0190209 | A1 | 8/2003 | Smith |
| 2004/0195858 | A1 | 10/2004 | Martin |
| 2008/0217952 | A1 | 9/2008 | Royer |
| 2010/0230994 | A1 | 9/2010 | Royer |
| 2010/0320798 | A1 | 12/2010 | Huotari et al. |
| 2011/0084513 | A1* | 4/2011 | Chenowth ............ B61D 39/006 296/100.12 |
| 2011/0254310 | A1 | 10/2011 | Royer |
| 2016/0332557 | A1 | 11/2016 | Royer |

OTHER PUBLICATIONS

PCT Written Opinion report for PCT patent application PCT/IB2020/062073, from which the present patent application is a national phase, issued on Mar. 23, 2021.

* cited by examiner

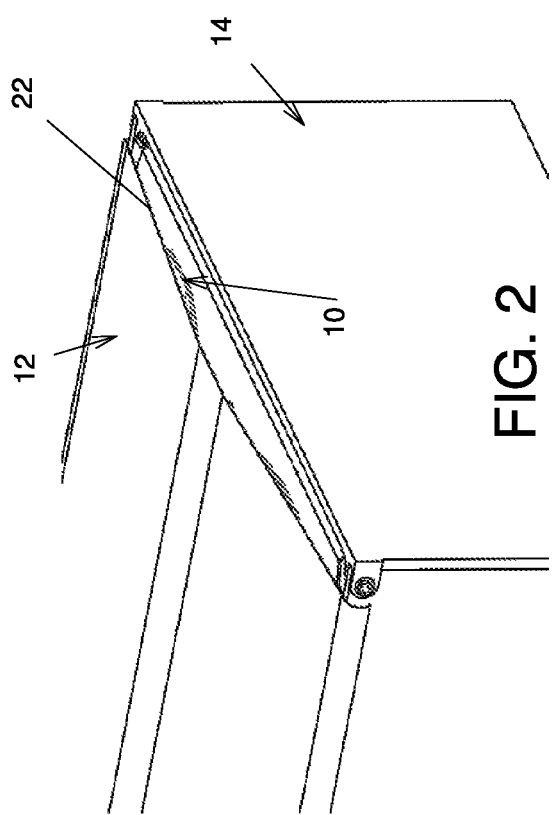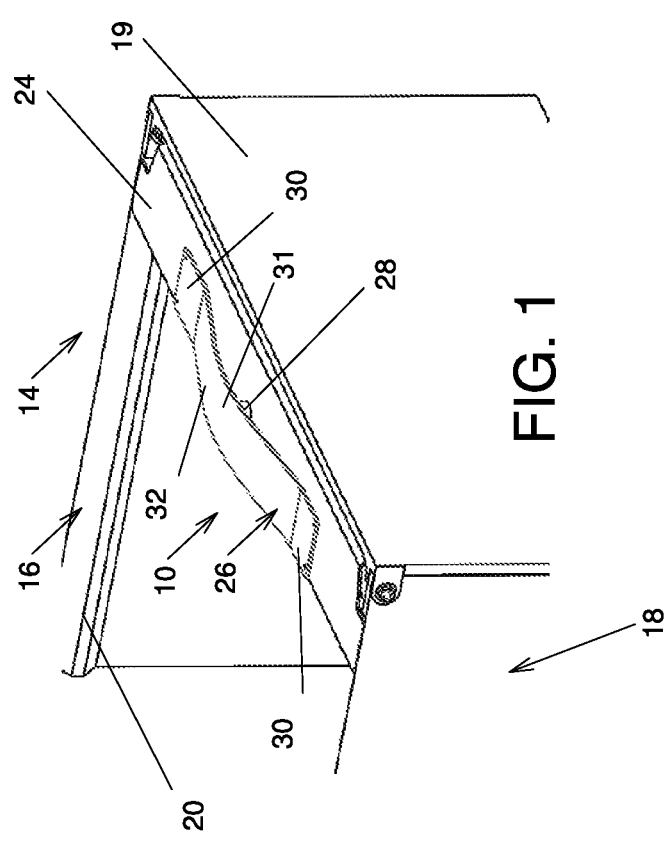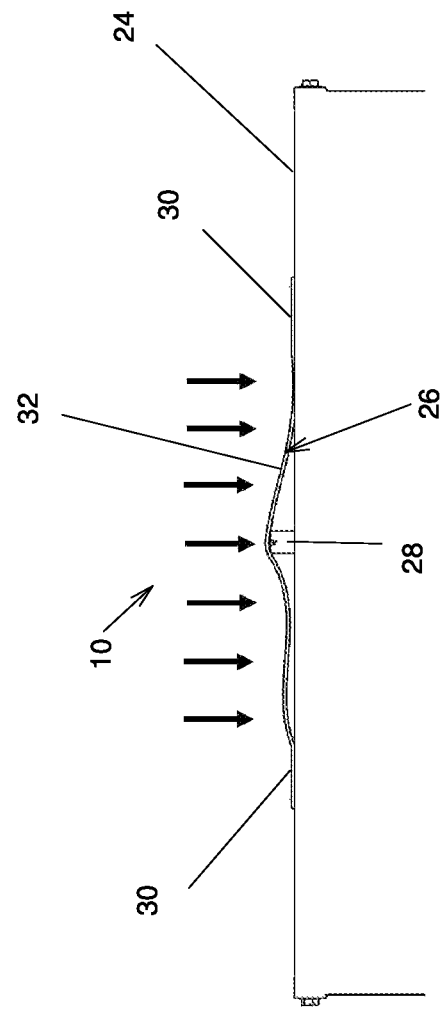

TARPAULIN PROTECTION DEVICES

FIELD OF THE INVENTION

The present invention relates generally to the field of transportation, and, more particularly, to devices for protecting tarpaulins, for example from damages caused by flutter.

BACKGROUND

Tarpaulins are often used for covering top apertures of truck-movable containers, such as open top truck trailers and the bin of dump trucks. The tarpaulin may be deployed over the container using a dedicated deployment and retraction device, or may simply be positioned over the aperture and tightened using straps. Such tarpaulin are usually tightened with lateral tension, that is tension that is oriented laterally relative to the normal direction of movement when the container is moved by the vehicle.

Even when the tarpaulin is under sufficient tension to maintain it in position over the container, parts of the tarpaulin may still move. More specifically, the rear end of the the tarpaulin may flutter at high speed or when strong headwinds are present. With time, such flutter may fray the rear end of the tarpaulin to a point where it needs replacing, which causes maintenance downtime and replacement costs.

Against this background, there exists a need for a tarpaulin protection device. An object of the present invention is to provide such devices.

SUMMARY OF THE INVENTION

In a broad aspect there is provided a vehicle container movable by a vehicle, the vehicle container comprising: a bottom wall and a peripheral wall extending upwardly therefrom, the peripheral wall being terminated opposed the bottom wall by a peripheral wall top edge delimiting a container top aperture, the peripheral wall defining a wall rear end located at a rear of the container when the container is moved by the vehicle; a tarpaulin movable between extended and retracted configurations, wherein, in the extended configuration, the tarpaulin is mounted to the container extending across the container top aperture, and in the retracted configuration, the tarpaulin is withdrawn from at least part of the container top aperture to allow access to the container, the tarpaulin defining a tarpaulin rear end edge; and a flutter reducer operatively coupled to the tarpaulin so that when the tarpaulin is in the extended configuration and the container is moved by the vehicle, the flutter reducer limits movements of the tarpaulin at the tarpaulin rear end edge to reduce flutter due to relative wind caused by movement through air of the covered vehicle container.

There may also be provided a vehicle container wherein the flutter reducer includes a reinforcement member mounted to the tarpaulin at the tarpaulin rear end edge.

There may also be provided a vehicle container wherein the reinforcement member has a flexural modulus at least 10 time larger than the tarpaulin.

There may also be provided a vehicle container wherein the reinforcement member has a flexural modulus of at least 10 GPa.

There may also be provided a vehicle container wherein the reinforcement member is substantially rigid.

There may also be provided a vehicle container wherein the reinforcement member is substantially elongated and is mounted longitudinally along the tarpaulin substantially perpendicular to the tarpaulin rear end edge.

There may also be provided a vehicle container wherein the reinforcement member includes an elongated slat.

There may also be provided a vehicle container wherein the reinforcement member is received in a pocket extending along the tarpaulin.

There may also be provided a vehicle container wherein in the extended configuration, the tarpaulin is stretched taut laterally across the container top aperture.

There may also be provided a vehicle container wherein the reinforcement member extends along only part of a length of the tarpaulin.

There may also be provided a vehicle container wherein the reinforcement member extends between about 5 and about 15 percent of the length of the tarpaulin.

There may also be provided a vehicle container wherein the flutter reducer includes a support member mounted to the container peripheral wall at the wall rear end and reaching above the peripheral wall top edge, the support member defining an apex, the tarpaulin abutting against the support member at the apex in the tarpaulin extended configuration.

There may also be provided a vehicle container wherein the container top edge is substantially rectilinear and horizontal at the wall rear end.

There may also be provided a vehicle container wherein the support member includes a resiliently deformable blade arcing above the peripheral wall top edge.

There may also be provided a vehicle container further comprising a central support extending between the blade and the peripheral wall top edge.

There may also be provided a vehicle container wherein the apex is substantially laterally centered relative to the container.

There may also be provided a vehicle container wherein the blade is from about 1 m to about 2 m long and from about 15 cm to about 20 cm large.

There may also be provided a vehicle container wherein the flutter reducer further includes a reinforcement member mounted to the tarpaulin at the tarpaulin rear end edge.

There may also be provided a vehicle container wherein the blade includes at least a portion thereof that is resiliently deformable downwardly.

There may also be provided a vehicle container wherein at least part of the tarpaulin is vertically spaced apart from the peripheral wall top edge at the tarpaulin rear end edge.

In another broad aspect, there is provided a method of reducing damage due to flutter in a tarpaulin extended across a top aperture delimited by a peripheral wall top edge of a vehicle container moving through air, the method comprising: rigidifying the tarpaulin at a rear end thereof to reduce amplitude of the flutter due to relative wind between the tarpaulin and the air.

In another broad aspect, there is provided a method wherein rigidifying the tarpaulin includes abutting the tarpaulin at the tarpaulin rear end edge against a support member protruding above the peripheral wall top edge.

In another broad aspect, there is provided a method wherein the tarpaulin is abutted against the support member substantially laterally centered relative to the container.

In another broad aspect, there is provided a method further comprising stretching the tarpaulin above the support member with a larger tension than forwardly located portions of the tarpaulin.

In another broad aspect, there is provided a method wherein reducing the flutter further includes rigidifying the tarpaulin along a section thereof adjacent the tarpaulin rear end edge.

In another broad aspect, there is provided a method wherein rigidifying the tarpaulin includes reducing longitudinal bending of the tarpaulin through a reinforcement member mounted to the tarpaulin, the reinforcement member being more rigid than the tarpaulin.

In yet another broad aspect, there is provided a rigidified tarpaulin including: a flexible tarpaulin defining a tarpaulin rear end edge; and a substantially rigid reinforcement member mounted to the tarpaulin at the tarpaulin rear end edge.

In yet another broad aspect, there is provided a vehicle container, comprising: a bottom wall and a peripheral wall extending upwardly therefrom, the peripheral wall defining a wall rear end; and a blade mounted to the container above the wall rear end and defining an apex located higher than the peripheral wall, the blade being resiliently deformable downwardly.

Advantageously, the proposed manners of protecting a tarpaulin can be implemented relatively cost-effectively and rapidly. Also, in some embodiments, the operation of an already-installed tarpaulin manipulating system may be unaffected by the proposed flutter reducers.

Other objects, advantages and features of the present invention will become more apparent upon reading of the following non-restrictive description of some embodiments thereof, given by way of example only with reference to the accompanying drawings.

BRIEF DESCRIPTION OF THE DRAWINGS

FIG. 1, in a perspective view, illustrates a flutter reducer in accordance with an embodiment of the present invention, here shown secured to a peripheral edge rear portion of an aperture delimited at the top of a container;

FIG. 2, in a perspective view, illustrates the flutter reducer of FIG. 1 engaging a tarpaulin for reducing or eliminating flutter induced damages in the tarpaulin;

FIG. 4, in a rear elevation view, illustrates deformation of the flutter reducer of FIGS. 1 to 3 under external loads;

DETAILED DESCRIPTION

Figure 8:
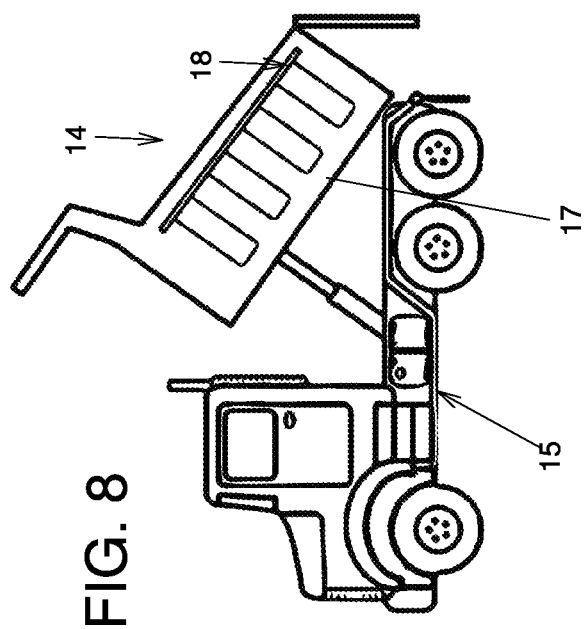
FIG. 8, in a side elevation view, illustrates a vehicle to which the flutter reducers and tarpaulins illustrated in FIGS. 1 to 7 may be mounted.

Referring to FIG. 1 for example, there is shown a flutter reducer 10 protecting a tarpaulin 12 (seen for example in FIG. 2) to eliminate or reduce damages due to fluttering. The flutter reducer 10 is mounted to a container 14 that can be selectively covered using the tarpaulin 12. Referring to FIG. 8, the container 14 is a vehicle container movable by a vehicle 15. For example, the container 14 is part of a dump truck, or any other suitable vehicle 15, is a trailer pulled by a tractor, or is part of a train wagon, among other possibilities. Typically, as seen in FIG. 8, the container 14 defines a container bottom wall 17 and a container peripheral wall 18 extending therefrom. Referring to FIG. 1, the container peripheral wall 18 defines a container top aperture 20 delimited by a peripheral wall top edge 16, opposed to the container bottom wall 17. The container peripheral wall 18 defines a wall rear end 19. The container peripheral wall 18 may include a pivoting door at the wall rear end 19, or may be permanently closed at the wall rear end 19. The wall rear end 19 is located at a rear of the container 14 when the container is moved by the vehicle 15. The flutter reducer 10 is however also usable with other structures that may lack the container bottom wall 17 or part of the container peripheral wall 18. The peripheral wall top edge 16 is in some embodiments in a single plane. In other embodiments, the peripheral wall top edge 16 is not in a single plane. For example, the front and rear portions thereof are arcuate.

The term "substantially" is used throughout this document to indicate variations in the thus qualifies terms. These variations are variations that do not materially affect the manner in which the invention works and can be due, for example, to uncertainty in manufacturing processes or to small deviations from a nominal value that do not cause significant changes to the invention. These variations are to be interpreted from the point of view of the person skilled in the art. Also, directional terminology such as top and rear, among others, is used in this document and refer to the flutter reducer 10 and container 14 in a typical operational configuration. Rear refers to a direction opposed to front, the latter being a direction in which a vehicle 15 on which the flutter reducer 10 moves in high speed movements, for example when driving along a highway.

The tarpaulin 12 is movable between extended and retracted configurations, shown respectively in FIGS. 2 and 1. In the extended configuration, the tarpaulin 12 extends across the container top aperture 20, and in the retracted configuration, the tarpaulin 12 is withdrawn from at least part of the container top aperture 20, typically entirely or almost entirely, to allow access to the container 14. The tarpaulin 12 defines a tarpaulin rear end edge 22.

The flutter reducer 10 is operatively coupled to the tarpaulin 12 so that when the tarpaulin 12 is in the extended configuration and the container 14 is moved by the vehicle 15, the flutter reducer 10 limits movements of the tarpaulin at the tarpaulin rear end edge 22 to reduce flutter due to relative wind caused by movement through air of the covered container 14. The flutter reducer 10 thus increases the rigidity of the tarpaulin 12 so that amplitudes of movements due to relative wind buffeting the tarpaulin 12 is reduced.

Indeed, when extended across the container top aperture 20, the tarpaulin 12 is typically stretched taut thereacross, in a direction lateral relative to the direction of motion of the container 14 when the latter is pulled. At high speed, the tarpaulin 12 will tend to flutter at its tarpaulin rear end edge 22. The flutter reducer 10 reduces or eliminate this flutter by supporting part of the tarpaulin 12 at the tarpaulin rear end edge 22.

The tarpaulin 12 may be permanently mounted to the container 14 or may be removable therefrom. When permanently mounted, a conventional tarpaulin extension and retraction device (not shown in the drawings) is used to handle the tarpaulin 12. The device may be of the type referred to as "lateral", in which the tarpaulin is rolled around a rod extending along the length of the container 14 to store the tarpaulin. The rod is typically manipulated using one or two arms provided at the front and/or the rear of the container 14. The device may also be of the type referred to as "longitudinal" in which the tarpaulin is mounted to arches extending across the width of the trailer and movable longitudinally therealong. When moved together towards one extremity of the container 14, the arches pull the tarpaulin 12 to free at least part of the container top aperture 20. In embodiments in which the tarpaulin 12 is not permanently mounted to the container 14, the tarpaulin is attached typically to both sides of the container 14 and put under tension using straps. The flutter reducer 10 is also usable with any other suitable manner of securing the tarpaulin to the container 14.

The flutter reducer 10 takes the form of a support member mounted to the container peripheral wall 18 at the wall rear end 19 and reaching above the peripheral wall top edge 16 on top of a top edge rear portion 24 of the peripheral wall top edge 16. The flutter reducer 10 may also be mounted to a member extending laterally across the container 14 at its rear end. The flutter reducer 10 may have any suitable shape and dimensions and is for example in the form of a support member. An advantageous embodiment of the flutter reducer 10 includes a blade 26 and a support 28.

The blade 26 defines a pair of blade mounting portions 30 and a blade protruding portion 32 extending therebetween. The blade mounting portions 30 are each mounted to a respective location on the top edge rear portion 24, using for example an adhesive, rivets or bolts, among other possibilities. The blade protruding portion 32 extends above the top edge rear portion 24 between the blade mounting portions 30.

In some embodiments, the blade 26 is made of a resiliently deformable polymer sheet. In such embodiments, the blade mounting portions 30 are mounted to the top edge rear portion, which is for example substantially rectilinear and horizontal, at a distance such that the blade protruding portion 32 is not stretched flat, but instead protrudes above the top edge rear portion 24 in an arch to define an apex 31. Before mounting, the blade 26 may be rectilinear, the blade 26 being deformed to form an arch during the installation process. In other embodiments, the blade 26 is pre-formed to define the apex 31, or a portion thereof that will become the apex 31 after deformation during installation. The support 28, which is omitted in some embodiments, is provided between the blade protruding portion 32 and the top edge rear portion 24, typically at the apex 31. The support 28 is substantially rigid and supports the blade protruding portion 32, for example at a location midway between the blade mounting portions 30, laterally centered relative to the container 14. The support 28 is secured to at least one of the blade 26 and the top edge rear portion 24. For example, the support 28 is secured using a nut and bolt combination to the underside of the blade protruding portion 32. The blade protruding portion 32 is in some embodiments substantially smooth laterally relative to the container around its apex, so that no sharp edges are presented to the tarpaulin 12 across the direction under which tension is applied, which could result in damages to the tarpaulin 12. The tarpaulin 12 abuts against the blade 26 at the apex 31 in the tarpaulin extended configuration, in some embodiments slightly above more forwardly located portions of the tarpaulin 12. In other words, the apex 31 is slightly higher than an apex of the tarpaulin 12 in absence of the blade 26.

As seen in FIG. 4, if downward external forces are exerted on the blade 26 in the blade protruding portion 32, the latter will be able to deform to reduce the chance that the blade 26 will be accidentally damaged at locations spaced apart from the support 28. However, in other embodiments, the blade protruding portion 32 is more rigid or less deformable than in the embodiment illustrated in the drawings.

Figure 3:
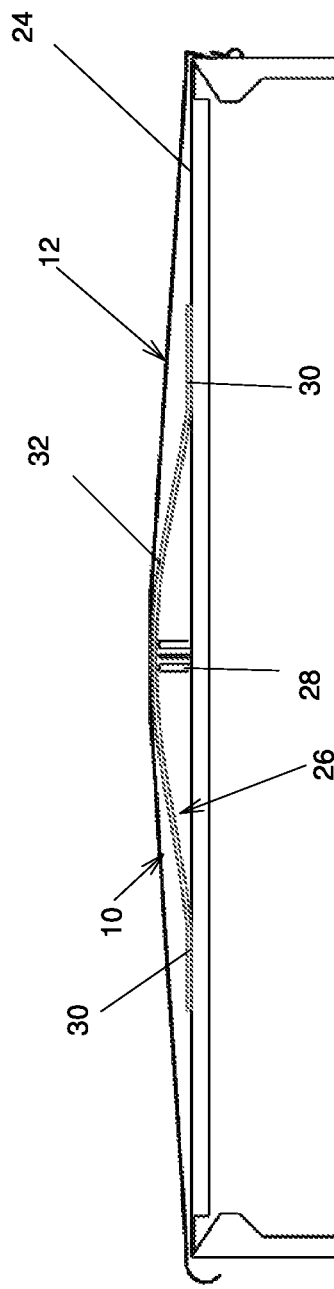
FIG. 3, in a rear cross-sectional view, illustrates the flutter reducer of FIG. 1 engaging the tarpaulin as in FIG. 2.

As better seen in FIG. 3, once the tarpaulin 12 has been extended across the container top aperture 20 and over the flutter reducer 10, the tarpaulin 12 will have its center at the tarpaulin rear end edge 22 abut against the blade protruding portion 32. This will create an increase in tension in the tarpaulin 12 at the tarpaulin rear end edge 22 when compared to the tension in front of the tarpaulin rear end edge 22, due to the fact that the tarpaulin 12 extends over a larger distance at the tarpaulin rear end edge 22 than further in front thereof. This tension will minimize or eliminate upward movements of the tarpaulin rear end edge 22, while the blade protruding portion 32 will minimize or eliminate downward movements of the tarpaulin rear end edge as the tarpaulin 12 abuts thereagainst. Since upward and downward movements are minimized, flutter will be either reduced or eliminated.

In a specific and non-limiting embodiment of the invention, the blade 26 is about 15 to 20 cm wide and about 1 to 2 m long. Also, in some embodiments, at least part of the tarpaulin 12 is vertically spaced apart from the peripheral wall top edge 16 at the tarpaulin rear end edge 22. In such embodiments, if there is no flutter reducer 10, large amplitude flutter can lead easily to tarpaulin 12 damage.

Figure 7:
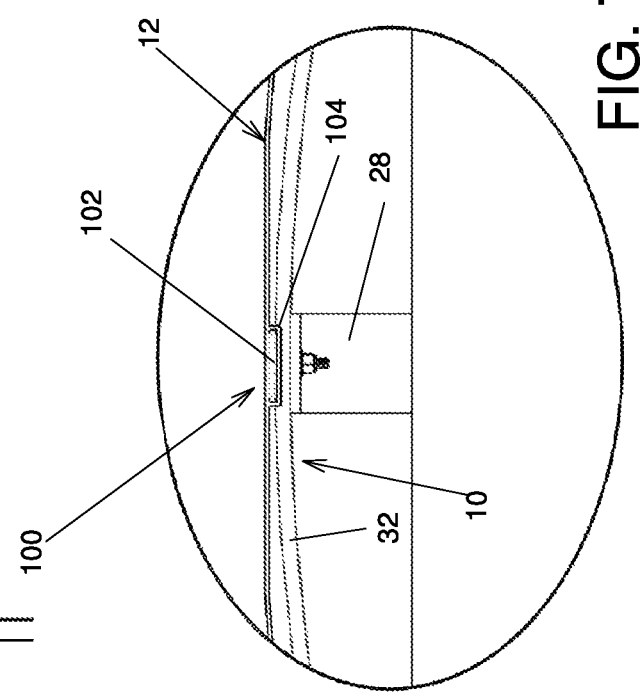
FIG. 7, in a rear cross-sectional view, illustrates the flutter reducer device of FIGS. 5 and 6.
Figure 6:
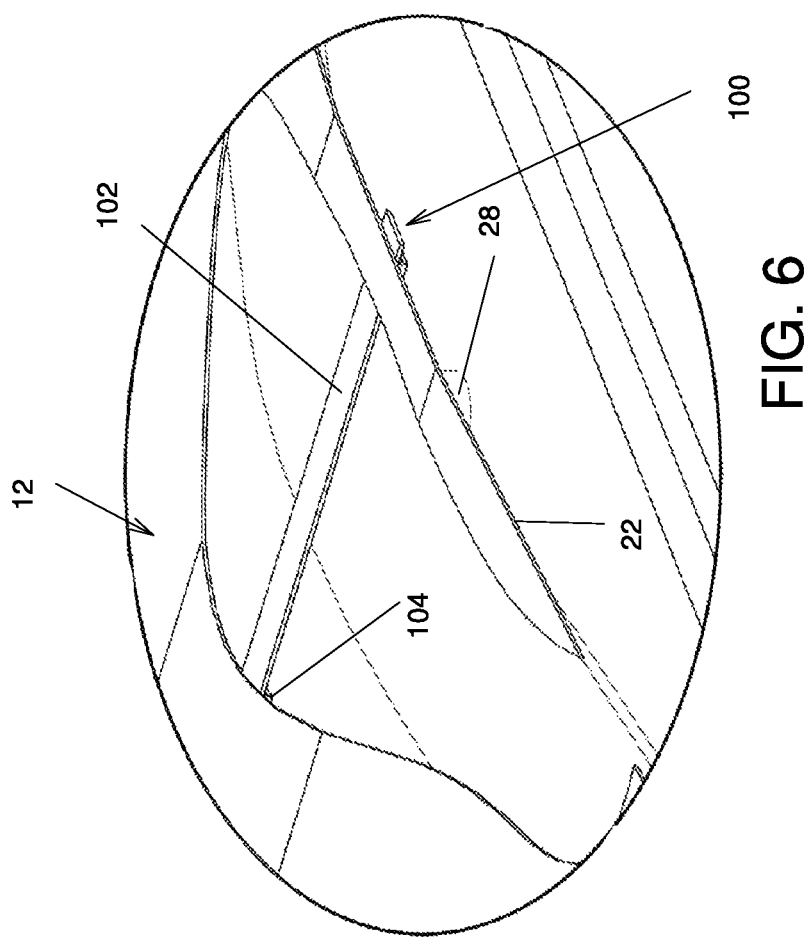
FIG. 6, in a partial perspective cutaway view, illustrates the flutter reducer of FIG. 5.
Figure 5:
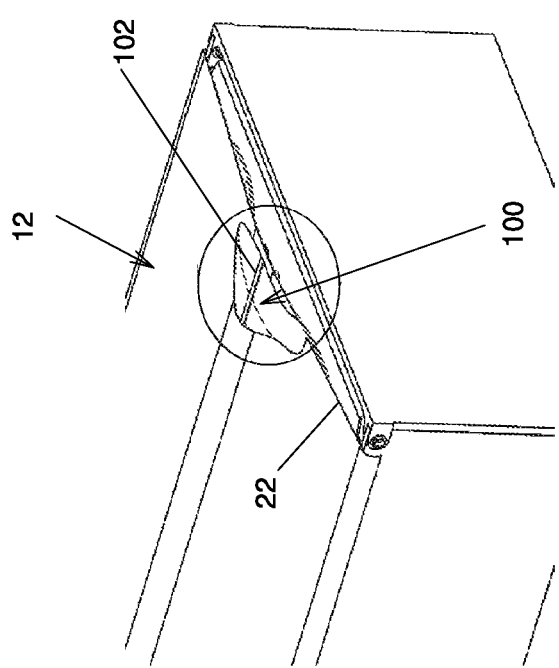
FIG. 5, in a perspective cutaway view, illustrates a flutter reducer in accordance with an alternative embodiment of the present invention.

FIGS. 5 to 7 illustrate another flutter reducer 100 usable to reduce or eliminate damages induced by flutter in the tarpaulin 12. The flutter reducer 100 may be used with or without the flutter reducer 10, and the latter may be used alone, without the former. The flutter reducer 100 includes a reinforcement member 102 mounted to the tarpaulin 12 at the tarpaulin rear end edge 22. The reinforcement member 102 may be mounted to the tarpaulin 12 in any suitable manner. For example, as seen in FIG. 6, the reinforcement member 102 is inserted in a pocket 104 sewn or otherwise secured to the tarpaulin 12. However, the reinforcement member 102 may be riveted or adhered to the tarpaulin 12, or otherwise mounted thereto. The reinforcement member 102 is for example substantially elongated and mounted longitudinally along the tarpaulin 12 substantially perpendicular to the tarpaulin rear end edge 22, midway laterally relative thereto. More than one reinforcement members 102 may also be provided, laterally and/or longitudinally spaced relative to each other.

The reinforcement member is substantially rigid. For example the reinforcement member 102 has a flexural modulus at least 10, at least 100, or at least 10 000 time larger than the tarpaulin 12. For example, the flexural modulus of the reinforcement member 102 is at least 10 GPa, or at least 50 GPa. The tarpaulin may have a flexural modulus of 2 GPa or less, for example and non-limitingly. The reinforcement member 102 extends from the tarpaulin rear end edge 22 towards the front of the tarpaulin and reinforces the tarpaulin 12 to reduce the tendency of the central portion of the tarpaulin 12 to deform towards the bottom of the container 14. This will also reduce flutter. The reinforcement member 102 may be made of a suitable polymer or metal, for example, and have a length of between 1 and 2 meters, among other possibilities. Typically, the reinforcement member only extends along part of a length of the tarpaulin 12, for example along about 5 to 15 percent thereof. The reinforcement member takes for example the form of an elongated slat or rod, among other possibilities.

The pocket 104 may be closed at the tarpaulin rear end edge 22, so that the reinforcement member 102 is permanently integrated to the tarpaulin 12. In other embodiments, the pocket 104 may also be open or reversibly closable at the tarpaulin rear end edge 22 to that the reinforcement member 102 may be removed to facilitate storage and handling of the tarpaulin 12, or when the tarpaulin 12 is used across structures that would not provide support for the reinforcement member 102.

Generally speaking, the flutter reducer 10 eliminates or reduces the amplitude of at least some lateral oscillation modes in the tarpaulin 12, while the flutter reducer 100 eliminates or reduces the amplitude of at least some longitudinal oscillation modes in the tarpaulin 12, longitudinal being with reference to a front-to-back direction of movement of the vehicle 15, and lateral being perpendicular to longitudinal. This will reduce movements of the tarpaulin 12 at the tarpaulin rear end edge 22. Some embodiments of both flutter reducers 10 and 100 act by rigidifying the tarpaulin 12. Indeed, in absence of the flutter reducers 10 and 100, the boundary condition at the tarpaulin rear end edge 22 is such that his tarpaulin rear end edge 22 is free to move, except at the lateral ends thereof. By reducing the amplitude of the lowest frequency modes, flutter induced damages are reduced or eliminated as the forces on the tarpaulin rear end edge 22 can be maintained at a level at which the tarpaulin 12 remains intact, or is at least more durable.

Although the present invention has been described hereinabove by way of exemplary embodiments thereof, it will be readily appreciated that many modifications are possible in the exemplary embodiments without materially departing from the novel teachings and advantages of this invention. Accordingly, the scope of the claims should not be limited by the exemplary embodiments, but should be given the broadest interpretation consistent with the description as a whole. The present invention can thus be modified without departing from the spirit and nature of the subject invention as defined in the appended claims.

What is claimed is:

1. A vehicle container movable by a vehicle, the vehicle container comprising
    a bottom wall and a peripheral wall extending upwardly therefrom, the peripheral wall being terminated opposed the bottom wall by a peripheral wall top edge delimiting a container top aperture, the peripheral wall defining a wall rear end located at a rear of the container when the container is moved by the vehicle;
    a tarpaulin movable between extended and retracted configurations, wherein, in the extended configuration, the tarpaulin is mounted to the container extending across the container top aperture, and in the retracted configuration, the tarpaulin is withdrawn from at least part of the container top aperture to allow access to the container, the tarpaulin defining a tarpaulin rear end edge; and
    a flutter reducer operatively coupled to the tarpaulin so that when the tarpaulin is in the extended configuration and the container is moved by the vehicle, the flutter reducer limits movements of the tarpaulin at the tarpaulin rear end edge to reduce flutter due to relative wind caused by movement through air of the covered vehicle container;
    wherein the flutter reducer includes a reinforcement member more rigid than the tarpaulin mounted to the tarpaulin at the tarpaulin rear end edge and extending along only part of a length of the tarpaulin, the reinforcement member being operatively coupled to the tarpaulin for reducing longitudinal bending of the tarpaulin.

2. The vehicle container as defined in claim 1, wherein the reinforcement member has a flexural modulus at least 10 time larger than the tarpaulin.

3. The vehicle container as defined in claim 1, wherein the reinforcement member has a flexural modulus of at least 10 GPa.

4. The vehicle container as defined in claim 1, wherein the reinforcement member is substantially elongated and is mounted longitudinally along the tarpaulin substantially perpendicular to the tarpaulin rear end edge.

5. The vehicle container as defined in claim 4, wherein the reinforcement member includes an elongated slat.

6. The vehicle container as defined in claim 4, wherein the reinforcement member is received in a pocket extending along the tarpaulin.

7. The vehicle container as defined in claim 1, wherein in the extended configuration, the tarpaulin is stretched taut laterally across the container top aperture.

8. The vehicle container as defined in claim 1, wherein the reinforcement member extends between about 5 and about 15 percent of a length of the tarpaulin.

9. The vehicle container as defined in claim 1, wherein the flutter reducer includes a support member mounted to the container peripheral wall at the wall rear end and reaching above the peripheral wall top edge, the support member defining an apex, the tarpaulin abutting against the support member at the apex in the tarpaulin extended configuration.

10. The vehicle container as defined in claim 9, wherein the container top edge is substantially rectilinear and horizontal at the wall rear end.

11. The vehicle container as defined in claim 9, wherein the support member includes a resiliently deformable blade arcing above the peripheral wall top edge.

12. The vehicle container as defined in claim 11, further comprising a central support extending between the blade and the peripheral wall top edge.

13. The vehicle container as defined in claim 11, wherein the blade includes at least a portion thereof that is resiliently deformable downwardly.

14. A method of reducing damage due to flutter in a tarpaulin extended across a top aperture of a vehicle container moving through air, the top aperture being delimited by a peripheral wall top edge, the method comprising: rigidifying the tarpaulin at a rear end thereof to reduce amplitude of the flutter due to relative wind between the tarpaulin and the air; wherein reducing the flutter further includes rigidifying the tarpaulin along a section thereof adjacent the tarpaulin rear end edge by reducing longitudinal bending of the tarpaulin through a reinforcement member mounted to the tarpaulin, the reinforcement member being more rigid than the tarpaulin and extending along only part of a length of the tarpaulin.

15. The method as defined in claim 14, wherein rigidifying the tarpaulin includes abutting the tarpaulin at the tarpaulin rear end edge against a support member protruding above the peripheral wall top edge.

16. The method as defined in claim 15, wherein the tarpaulin is abutted against the support member substantially laterally centered relative to the container.

17. The method as defined in claim 15, further comprising stretching the tarpaulin above the support member with a larger tension than forwardly located portions of the tarpaulin.

* * * * *